United States Patent
Saxman et al.

(10) Patent No.: US 9,256,722 B2
(45) Date of Patent: Feb. 9, 2016

(54) SYSTEMS AND METHODS OF USING A TEMPORARY PRIVATE KEY BETWEEN TWO DEVICES

(75) Inventors: Paul Saxman, Mountain View, CA (US); J. Leslie Vogel, Oakland, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/554,928

(22) Filed: Jul. 20, 2012

(65) Prior Publication Data
US 2014/0026193 A1    Jan. 23, 2014

(51) Int. Cl.
    G06F 21/33    (2013.01)
    H04L 29/06    (2006.01)

(52) U.S. Cl.
    CPC ............ *G06F 21/33* (2013.01); *H04L 63/0853* (2013.01); *H04L 63/102* (2013.01); *H04L 63/107* (2013.01); *H04L 63/108* (2013.01)

(58) Field of Classification Search
    CPC ......... G06F 21/33; G06F 21/34; G06F 21/35; G06F 21/50; G06F 21/52; G06F 21/53; G06F 21/60; G06F 21/62; G06F 21/6245; G06F 2221/2111; G06F 2221/2137; H04L 63/06; H04L 63/068; H04L 63/08; H04L 63/083–63/0853; H04L 63/0884; H04L 63/0892; H04L 63/10; H04L 63/102; H04L 63/107; H04L 63/108; H04L 9/0861; H04L 9/0863; H04L 9/0872; H04L 9/0877; H04L 9/0891–9/0897; H04L 9/32–9/3213; H04L 9/324
    USPC ............................................................ 726/4
    See application file for complete search history.

(56) References Cited

U.S. PATENT DOCUMENTS

| 6,532,221 | B1 * | 3/2003 | Kim ...................... H04W 36/30 370/331 |
| 8,127,345 | B2 * | 2/2012 | Gregg et al. ...................... 726/7 |
| 8,347,103 | B2 * | 1/2013 | Jones et al. ..................... 713/184 |
| 8,898,743 | B1 * | 11/2014 | Kowalik et al. .................... 726/4 |
| 2006/0129829 | A1 | 6/2006 | Aaron et al. |
| 2007/0244991 | A1 * | 10/2007 | Dowling ........................ 709/218 |
| 2008/0184339 | A1 * | 7/2008 | Shewchuk et al. ................ 726/3 |
| 2010/0242097 | A1 * | 9/2010 | Hotes ....................... G06F 9/468 726/4 |
| 2011/0069196 | A1 * | 3/2011 | Jung et al. ................... 348/222.1 |

(Continued)

OTHER PUBLICATIONS

Google Inc., International Search Report and Written Opinion, PCT/US2013/051096, Oct. 16, 2013, 7 pgs.

(Continued)

*Primary Examiner* — Eric W Shepperd
(74) *Attorney, Agent, or Firm* — Morgan, Lewis & Bockius LLP

(57) ABSTRACT

A method executes at a personal user device associated with a user. The method receives a request from a shared user device, the request seeking access to personal information associated with the user. The personal information is stored at a resource server. The method receives access authentication information from the user. The method then sends the access authentication information to an authentication server, and receives an access token. The access token grants access privileges to the personal information. The method sends the access token to the shared user device, thereby permitting an application executing on the shared user device to use the access token for retrieving at least a portion of the personal information. The method detects a physical movement of the personal user device, then sends a message to the authentication server to revoke access privileges associated with the access token.

24 Claims, 12 Drawing Sheets

(56) References Cited

U.S. PATENT DOCUMENTS

| | | | |
|---|---|---|---|
| 2011/0137817 A1* | 6/2011 | Roumeliotis | H04L 63/102 705/325 |
| 2011/0153429 A1* | 6/2011 | Ullah | 705/14.64 |
| 2012/0050004 A1* | 3/2012 | Curtis et al. | 340/5.2 |
| 2012/0151210 A1 | 6/2012 | Perez | |
| 2012/0246039 A1* | 9/2012 | Fain | G06Q 10/08 705/32 |
| 2013/0014223 A1* | 1/2013 | Bhatia et al. | 726/4 |
| 2013/0031598 A1* | 1/2013 | Whelan et al. | 726/1 |
| 2013/0125211 A1* | 5/2013 | Cashman et al. | 726/4 |
| 2013/0137402 A1* | 5/2013 | Ergen | 455/411 |
| 2013/0143651 A1* | 6/2013 | Harrison et al. | 463/31 |
| 2013/0185772 A1* | 7/2013 | Jaudon et al. | 726/4 |
| 2013/0278405 A1* | 10/2013 | Bacal | B60Q 1/00 340/439 |
| 2013/0309971 A1* | 11/2013 | Kiukkonen et al. | 455/41.2 |

OTHER PUBLICATIONS

Google Inc., International Preliminary Report on Patentability, PCT/US2013/051096, Jan. 29, 2015, 5 pgs.

* cited by examiner

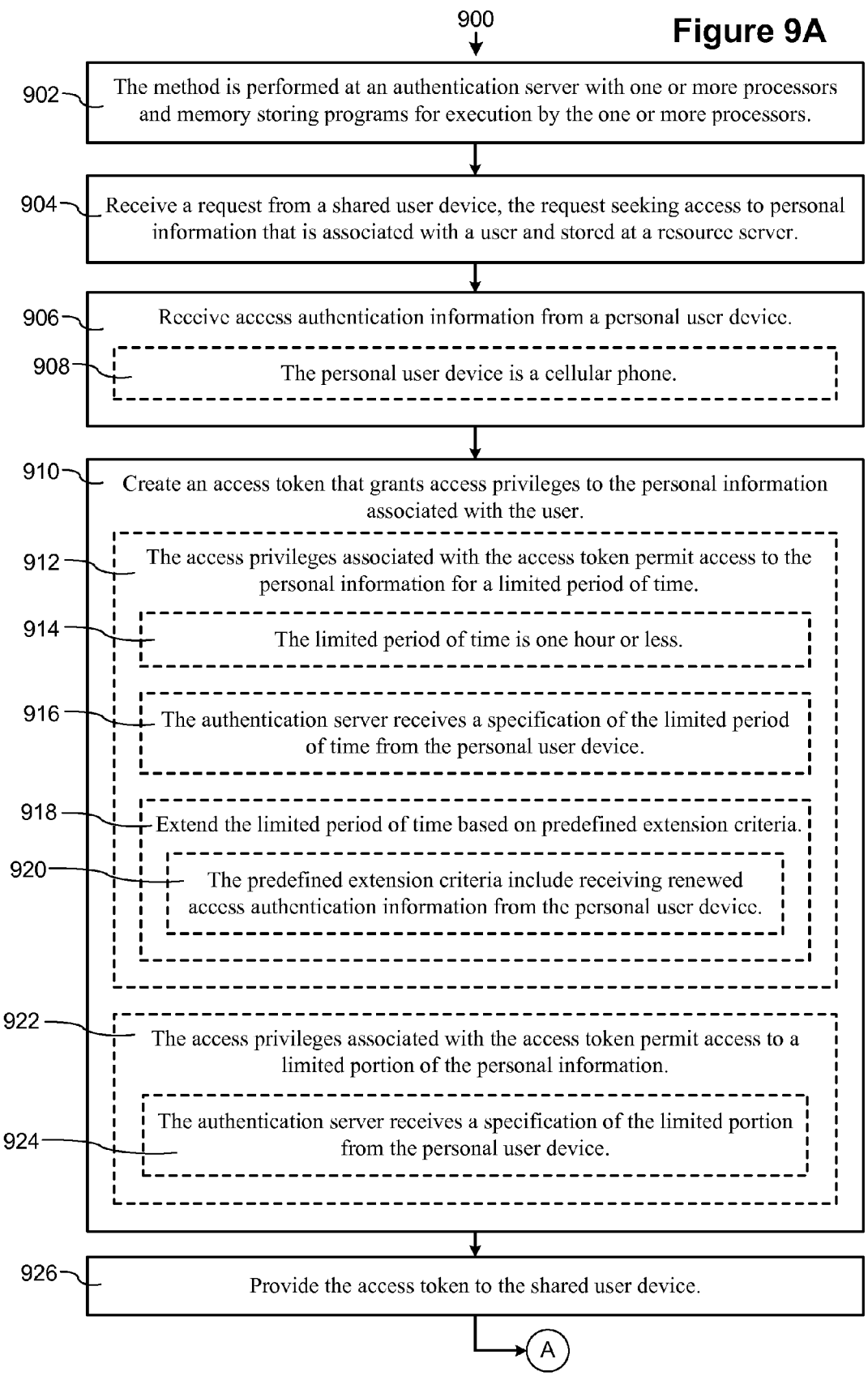

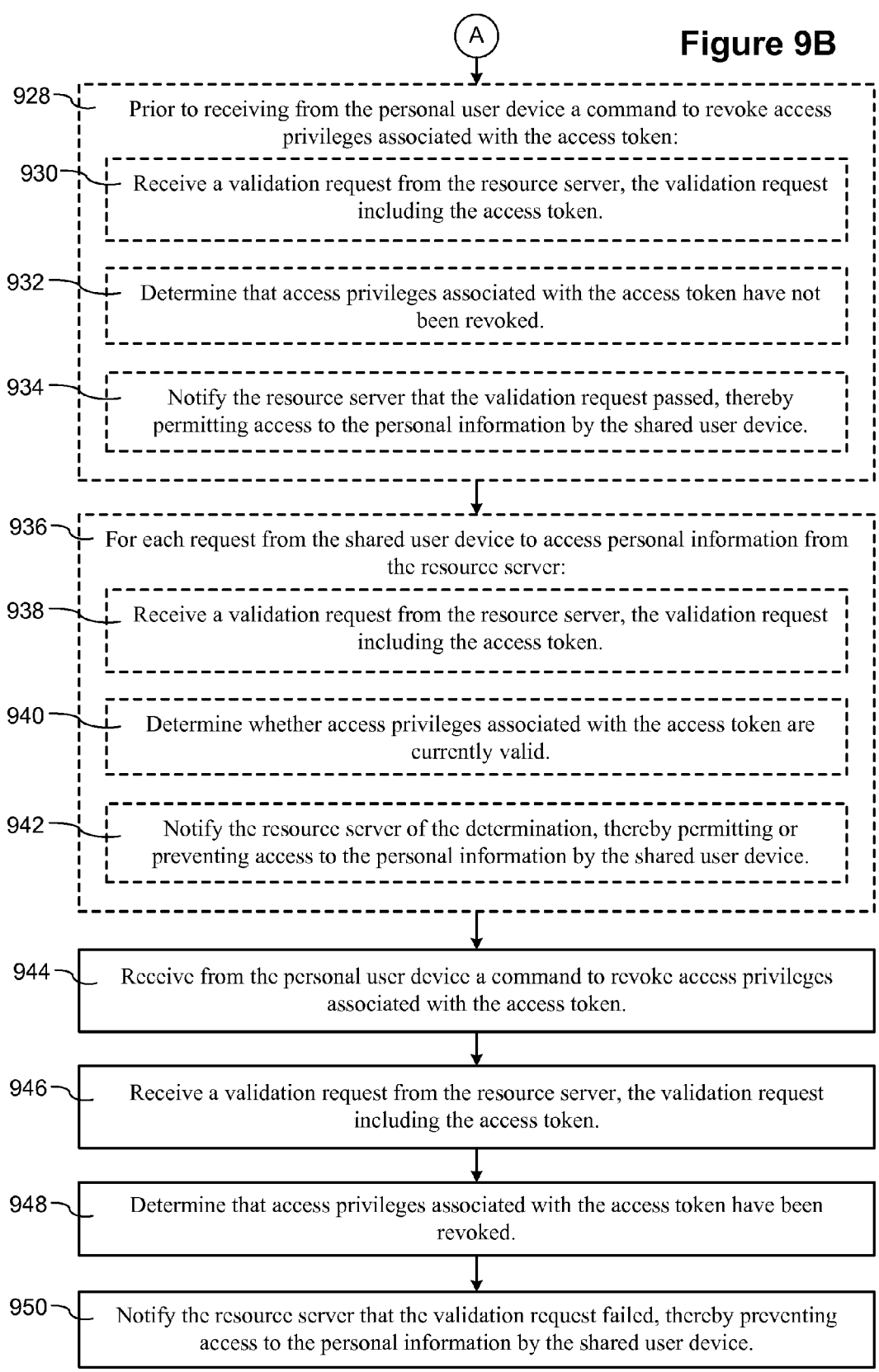

SYSTEMS AND METHODS OF USING A TEMPORARY PRIVATE KEY BETWEEN TWO DEVICES

TECHNICAL FIELD

The disclosure relates generally to security of personal user information, and more specifically to methods and systems for allowing limited access to personal information on a shared device.

BACKGROUND

A personal device, such as a mobile phone, can be used to securely access personal information. Once a user has been authenticated, the user can continue to access the information. Because people generally retain physical possession of their phones, there is only limited risk that an unauthorized user will gain access to an authenticated phone and thereby access personal information of the phone's owner.

However, a phone has a small display and small input mechanism (e.g., keyboard or "soft" keyboard) and thus a phone may not be an optimal device for accessing personal information.

On the other hand, some shared devices, such as a television with a set-top box or a desktop computer, are better suited to viewing content. For example, it is much easier to view content on a 30 inch display than on a 3.5 inch display. The ease of viewing on a shared device, however, creates a different problem. Once the user has provided credentials to access personal information, the shared device may continue to provide access to the personal information, even when the user is no longer using the shared device. That is, subsequent users of the shared device may have access to the first user's personal information.

Disclosed implementations can utilize various authorization protocols, such as the OAuth 2.0 Authorization Protocol. Authorization protocols enable a user to share access to restricted resources without sharing the user's primary credentials. In some implementations, the protocol utilizes access tokens, which may be limited in time and/or scope. Although access tokens eliminate the need to share a user's credentials, authorization protocols such as OAuth 2.0 do not prevent a shared device from continuing to access personal information of a user after the user is no longer using the shared device (the access token is still valid).

SUMMARY

Disclosed implementations address the above deficiencies and other problems associated with limiting access to personal information viewed on a shared device.

In accordance with some implementations, a computer-implemented method executes at a personal user device with one or more processors and memory. The memory stores one or more programs for execution by the one or more processors. The programs include instructions to receive a request from a shared user device distinct from the personal user device. The personal user device is associated with a user, and the request seeks access to personal information that is associated with the user. The personal information is stored at a resource server, which is distinct from both the personal user device and the shared user device. The programs further include instructions that receive access authentication information from the user. The programs also include instructions that respond to receiving the access authentication information from the user: the instructions send the access authentication information to an authentication server and receive an access token from the authentication server. The access token grants access privileges to the personal information associated with the user. The programs further include instructions that send the access token to the shared user device, thereby permitting an application executing on the shared user device to use the access token for retrieving at least a portion of the personal information. The programs include instructions that detect a physical movement of the personal user device, where the movement meets predefined motion criteria. The programs also include instructions that respond to detecting the physical movement: the instructions send a message to the authentication server to revoke access privileges associated with the access token.

In accordance with some implementations, a computer-implemented method executes at an authentication server with one or more processors and memory. The memory stores one or more programs for execution by the one or more processors. The programs include instructions to receive a request from a shared user device. The request seeks access to personal information that is associated with a user. The personal information is stored at a resource server. The programs also include instructions to receive access authentication information from a personal user device. The programs further include instructions to create an access token that grants access privileges to the personal information associated with the user, and to provide the access token to the shared user device. The programs also include instructions to receive from the personal user device a command to revoke access privileges associated with the access token. The programs further include instructions to receive a validation request from the resource server. The validation request includes the access token. The programs include instructions to determine that access privileges associated with the access token have been revoked. The programs also include instructions to notify the resource server that the validation request failed, thereby preventing access to the personal information by the shared user device.

Thus methods and systems are provided that enable a user to view personal information on a shared device, but limit or prevent others from accessing that personal information.

BRIEF DESCRIPTION OF THE DRAWINGS

For a better understanding of the aforementioned implementations of the invention as well as additional implementations thereof, reference should be made to the Description of Embodiments below, in conjunction with the following drawings in which like reference numerals refer to corresponding parts throughout the figures.

FIGS. 9A-B provide a flowchart of a process, performed at an authentication server, for providing a shared user device access to personal user information according to some implementations.

Figure 1:
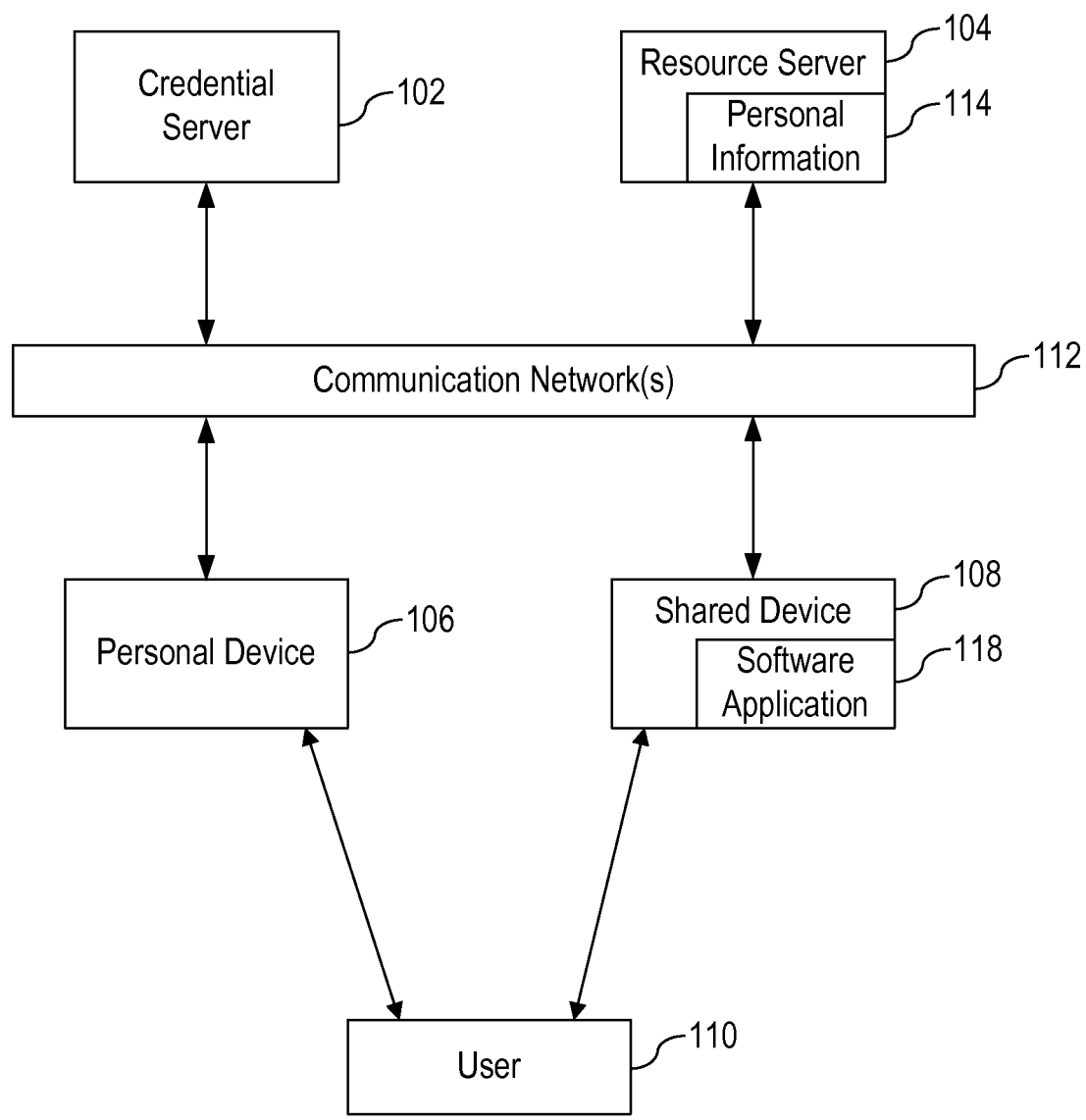
FIG. 1 illustrates an exemplary context in which some implementations operate.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

The terminology used in the description of the invention herein is for the purpose of describing particular implementations only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

DESCRIPTION OF EMBODIMENTS

As noted above, it would be useful to access personal information 114 from a shared device 108, but limit that access so that other users are not allowed to access that personal information 114. For example, a user may wish to view email or personal photographs, or interact with a social media application. Such activity is more easily performed on a shared device 108 with a large viewing area, rather than a small pocket-sized device such as a cellular phone. As described in more detail below, disclosed implementations can provide limited access to personal information 114 on a shared user device 108 by taking advantage of characteristics of personal user devices 106. By monitoring the proximity of the personal device 106 to the shared device 108, access to personal information 114 can be denied when the personal device 106 is moved. That is, disclosed implementations recognize movement of the user 110 away from the shared device 108 by detecting movement of the personal device 106 away from the shared device 108.

FIG. 1 is a block diagram that illustrates the major components of some implementations. The various devices and servers communicate over one or more networks 112 (such as the Internet). A user 110 operates both a personal user device 106 and a shared user device 108. In some implementations, the personal user device 106 is a mobile phone, such as a Smartphone that runs the ANDROID™ operating system. In some implementations, the personal device 106 is a personal digital assistant (PDA), a tablet computer, a laptop computer, an e-book reader, or a networked digital media player. Commonly a personal user device 106 is small enough to be carried in a pocket or a purse. A personal user device 106 is typically managed by a single person. A shared user device 108 is generally larger than a personal user device 106. A typical shared user device 108 is a television with a set-top box (e.g., GOOGLE TV) or a desktop computer. A shared user device 108 is typically used by two or more people.

Executing on the shared device 108 is a software application 118, such as GMAIL™, GOOGLE+™, or TWITTER™. In some implementations, the software application 118 executes within a web browser 320, and in other implementations, the software application 118 executes independently of a web browser 320. (The software application 118 can also execute on the personal user device 106, but executing the software application 118 on the personal user device 106 does not raise the problems addressed by the implementations disclosed herein.) The software application 118 utilizes certain personal information 114 associated with the user 110 (e.g., email messages). The personal information 114 is stored at a resource server 104. As described in more detail below with respect to FIGS. 6, 7, 8A-C, and 9A-B, the personal information 114 associated with a user 110 requires authentication for access. The credential server 102 provides the services for authenticated access to the personal information 114. Typically the credential server 102 and the resource server 104 are distinct servers, but in some implementations the credential server 102 and resource server 104 are implemented on a single server system. In other implementations, the credential server 102 and resource server 104 are distinct server systems, but share a common database server. A credential server 102 is also referred to herein as an "authentication server" or an "authorization server."

Figure 2:
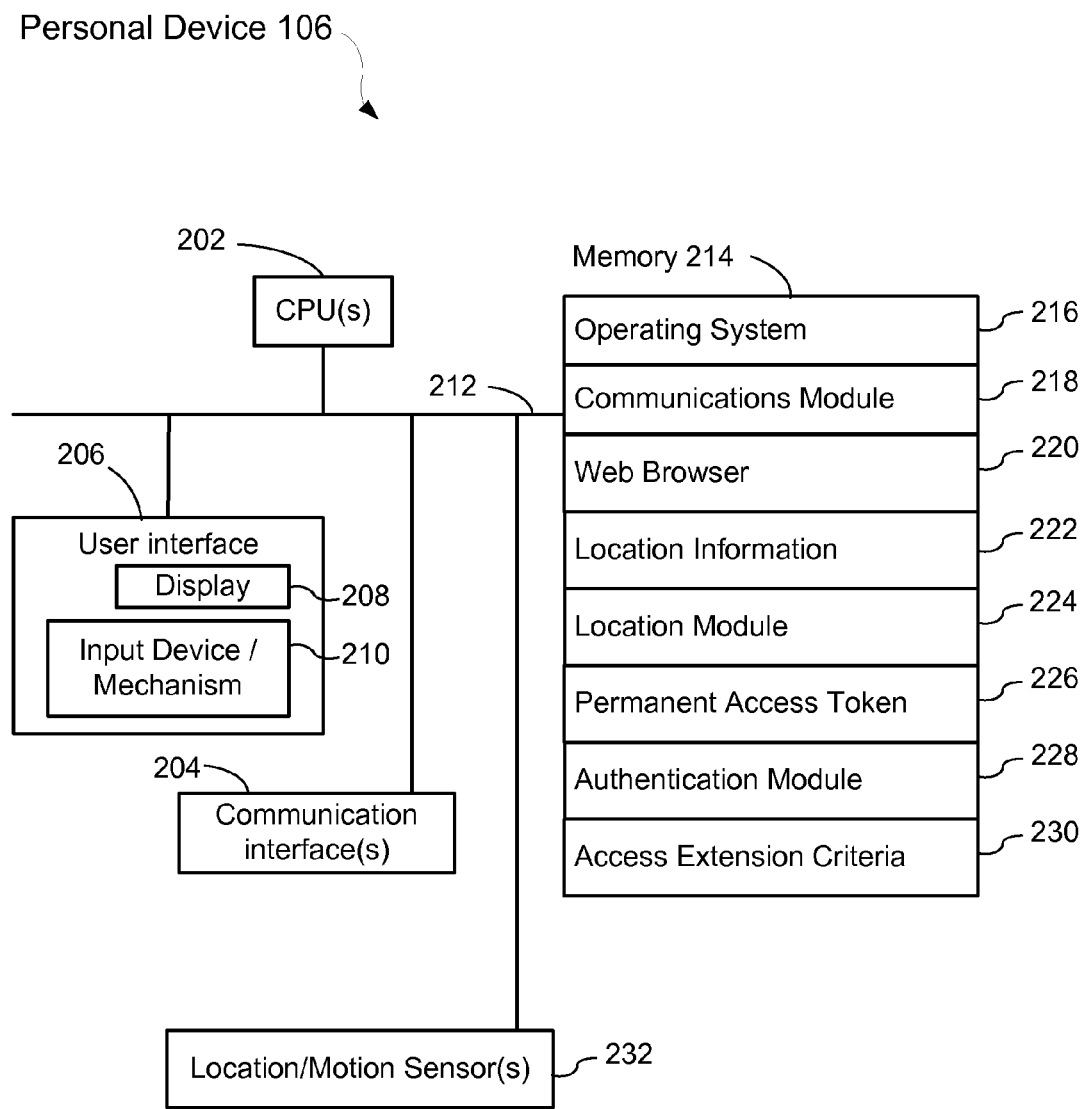
FIG. 2 is a block diagram of a personal device according to some implementations.

FIG. 2 is a block diagram illustrating a personal device 106 that a user 110 utilizes to authenticate with the authentication server 102 in accordance with some disclosed implementations. A personal device 106 typically includes one or more processing units (CPU's) 202 for executing modules, programs and/or instructions stored in memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. A personal device 106 includes a user interface 206 comprising a display device 208 and one or more input devices or mechanisms 210. In some implementations, the input device/mechanism includes a keyboard; in some implementations, the input device/mechanism includes a "soft" keyboard, which is displayed as needed on the display device 208, enabling a user 110 to "press keys" that appear on the display 208. In some implementations, the personal user device 106 includes one or more location/motion sensor(s) 232, which directly or indirectly measure the location of the personal device 106. The sensors in some personal devices 106 include gyroscopes, accelerometers, and GPS devices. In some implementations, memory 214 includes high-speed random access memory, such as DRAM, SRAM, DDR RAM or other random access solid state memory devices. In some implementations, memory 214 includes non-volatile memory, such as one or more magnetic disk storage devices, optical disk storage devices, flash memory devices, or other non-volatile solid state storage devices. Optionally, memory 214 includes one or more storage devices remotely located from the CPU(s) 202. Memory 214, or alternately the non-volatile memory device(s) within memory 214, comprises a computer readable storage medium. In some implementations, memory 214, or the computer readable storage medium of memory 214, stores the following programs, modules and data structures, or a subset thereof:

- an operating system 216 that includes procedures for handling various basic system services and for performing hardware dependent tasks;
- a communications module 218 that is used for connecting the personal device 106 to other computers and devices via the one or more communication network interfaces 204 (wired or wireless) and one or more communication networks 112, such as the Internet, other wide area networks, local area networks, metropolitan area networks, and so on;

a web browser 220 (or other client application) that enables a user 110 to communicate over a network 112 (such as the Internet) with remote computers or devices;

location information 222 that identifies the absolute location of the personal device 106 and/or the location of the personal device 106 relative to another device, such as a shared device 108 and/or other information that can be used to identify movement of the personal device 106. In some implementations, the location information 222 includes information from sensors included in the personal device 106, such as GPS hardware and software, an accelerometer sensor, or a gyroscope sensor. Although a gyroscope or accelerometer detect motion, they can be used in conjunction with other location information (e.g., GPS) to identify location. In some implementations, the location information 222 includes the predefined criteria that trigger revocation of access privileges to the personal information 114;

location module 224 that tracks movement of the personal device 106 and determines when that movement meets the predefined motion criteria;

a "permanent" access token 226, which the personal device 106 can use in lieu of requiring the user 110 to enter access credentials every time the user accesses secured information. Some implementations use permanent access tokens 226, but they are not required;

an authentication module 228, which acquires a temporary access token 322, and provides the access token 322 to a shared user device 108. As described below with respect to FIG. 8A-C, the access token 322 enables the shared device 108 to access personal user information 114 stored at a resource server 104. The authentication module also revokes the access privileges of the access token 322 when movement of the personal device 106 meets predefined criteria; and access extension criteria 230, which specify when the limited duration of a temporary access token 322 may be extended. Access extension criteria 230 are also referred to herein as renewal criteria, and pertain to extensions of time. (Some implementations also provide for extensions of access scope as well.) As explained with respect to FIG. 8B below, the access extension criteria 230 may include receiving renewed access authentication information from the user. For example, the user 110 may be required to re-enter a user name and password. In some implementations, the access extension criteria include determining that the personal user device 106 is within a renewal radius of the shared user device 108. In some implementations, the access extension criteria include determining that the personal user device has not moved more than a predefined renewal distance.

Figure 3:
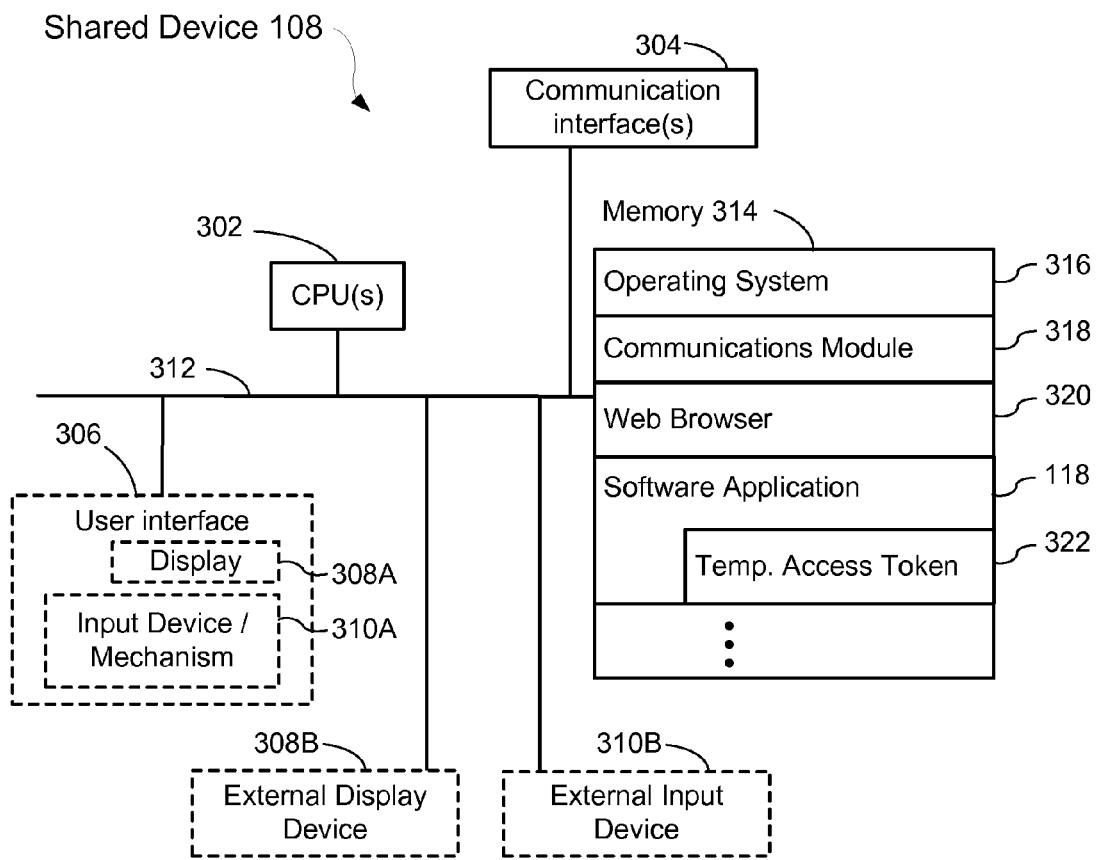
FIG. 3 is a block diagram of a shared device according to some implementations.

FIG. 3 is a block diagram illustrating a shared user device 108 that a user 110 utilizes to use/access/play various software applications 118. For example, software applications 118 may provide access to digital content, email, online social media, interactive games, etc. A shared device 108 typically includes one or more processing units (CPU's) 302 for executing modules, programs and/or instructions stored in memory 314 and thereby performing processing operations; one or more network or other communications interfaces 304; memory 314; and one or more communication buses 312 for interconnecting these components. The communication buses 312 may include circuitry (sometimes called a chipset) that interconnects and controls communications between system components. A shared device 108 may include a user interface 306 comprising zero or more display devices 308A (e.g., a screen or monitor) and zero or more input devices or mechanisms 310A. In some implementations, the input device/mechanism 310B includes a keyboard. Some implementations include an external display device 308B, such as a television (e.g., when the shared device 108 is a set-top box). Some implementations include an external input device 310B, such as a hand-held remote control. In some implementations, memory 314 includes high-speed random access memory, such as DRAM, SRAM, DDR RAM or other random access solid state memory devices. In some implementations, memory 314 includes non-volatile memory, such as one or more magnetic disk storage devices, optical disk storage devices, flash memory devices, or other non-volatile solid state storage devices. Optionally, memory 314 includes one or more storage devices remotely located from the CPU(s) 302. Memory 314, or alternately the non-volatile memory device(s) within memory 314, comprises a computer readable storage medium. In some implementations, memory 314, or the computer readable storage medium of memory 314, stores the following programs, modules and data structures, or a subset thereof:

an operating system 316 that includes procedures for handling various basic system services and for performing hardware dependent tasks;

a communications module 318 that is used for connecting the shared device 108 to other computers and devices via the one or more communication network interfaces 304 (wired or wireless) and one or more communication networks 112, such as the Internet, other wide area networks, local area networks, metropolitan area networks, and so on;

a web browser 320 (or other client application) that enables a user 110 to communicate over a network 112 (such as the Internet) with remote computers or devices;

one or more software applications 118, which may execute within web browser 320 or may execute independently of web browser 320; and a temporary access token 322 that is used to access personal information 114 stored at the resource server 104. When there are multiple software applications 118 that utilize personal information 114, some implementations require a distinct temporary access token 322 for each software application 118, but other implementations allow two or more software applications 118 to use a single temporary access token 322. A temporary access token 322 is typically limited in both duration and scope, as described in more detail below. When a device (such as a shared device 108) seeks access to personal information 114, the device includes the access token 322 with the request. In this way, every access to personal information 114 is validated.

Figure 4:
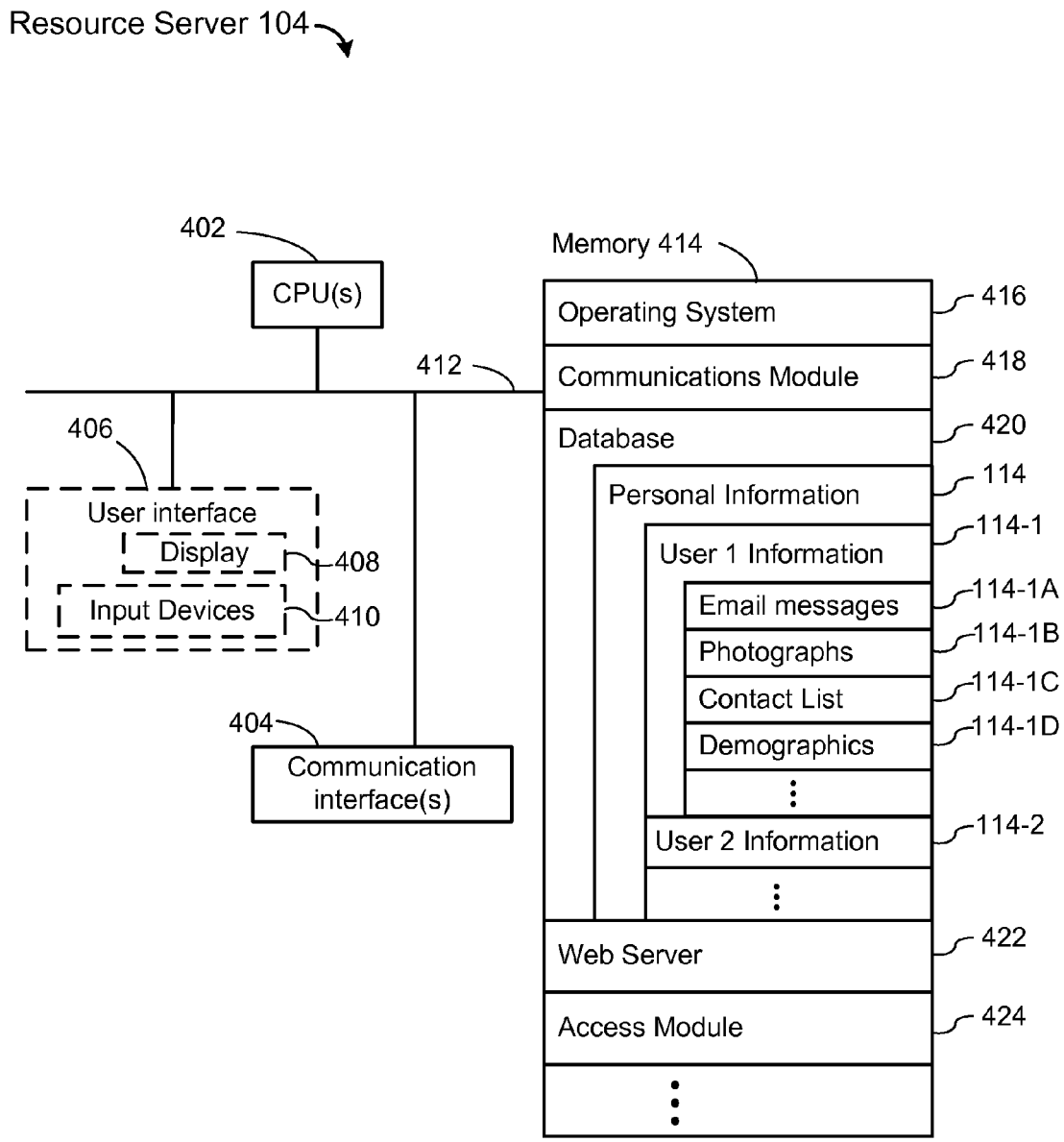
FIG. 4 is a block diagram of a resource server computer system according to some implementations.

FIG. 4 is a block diagram illustrating a resource server 104 that stores information used by one or more software applications 118 in accordance with some implementations. The resource server 104 typically includes one or more processing units (CPU's) 402 for executing modules, programs and/or instructions stored in memory 414 and thereby performing processing operations; one or more network or other communications interfaces 404; memory 414; and one or more communication buses 412 for interconnecting these components. The communication buses 412 may include circuitry (sometimes called a chipset) that interconnects and controls communications between system components. In some implementations, the resource server 104 includes a user interface 406, which may include a display device 408 and one or more input devices 410. In some implementations, memory 414 includes high-speed random access memory, such as DRAM, SRAM, DDR RAM or other random access solid state memory devices. In some implementations, memory 414 includes non-volatile memory, such as one or more magnetic disk storage devices, optical disk storage devices, flash memory devices, or other non-volatile solid state storage devices. In some implementations, memory 414 includes one or more storage devices remotely located from the CPU(s) 402. Memory 414, or alternately the non-volatile memory device(s) within memory 414, comprises a computer readable storage medium. In some implementations, memory 414, or the computer readable storage medium of memory 414, stores the following programs, modules and data structures, or a subset thereof:

- an operating system 416 that includes procedures for handling various basic system services and for performing hardware dependent tasks;
- a communications module 418 that is used for connecting the resource server 104 to other computers via the one or more communication network interfaces 404 (wired or wireless) and one or more communication networks 112, such as the Internet, other wide area networks, local area networks, metropolitan area networks, and so on;
- a database or file server 420 that stores data and other resources used by one or more software applications 118. The stored information includes personal user information 114 for users 110. The personal information for individual users, such as user 1 information 114-1 and user 2 information 114-2 may be stored in separate files by user, or may be consolidated. The personal information 114-1 for an individual user may include email messages 114-1A, personal photographs 114-1B, a contact list 114-1C, demographic information 114-1D, or other personal information 114-1 used by a software application 118. Regardless of the physical storage mechanism, access to the personal information 114 is limited based on individual user. As explained in greater detail below with respect to FIGS. 5-7, access to personal information 114 requires authentication;
- a web server 422, which responds to web requests, including requests to retrieve personal information 114; and
- an access module 424, which retrieves data (such as personal information 114) from the database 420, and verifies access privileges for each request by contacting the credential server 102. This process is illustrated in more detail below with respect to FIGS. 6 and 7.

Figure 5:
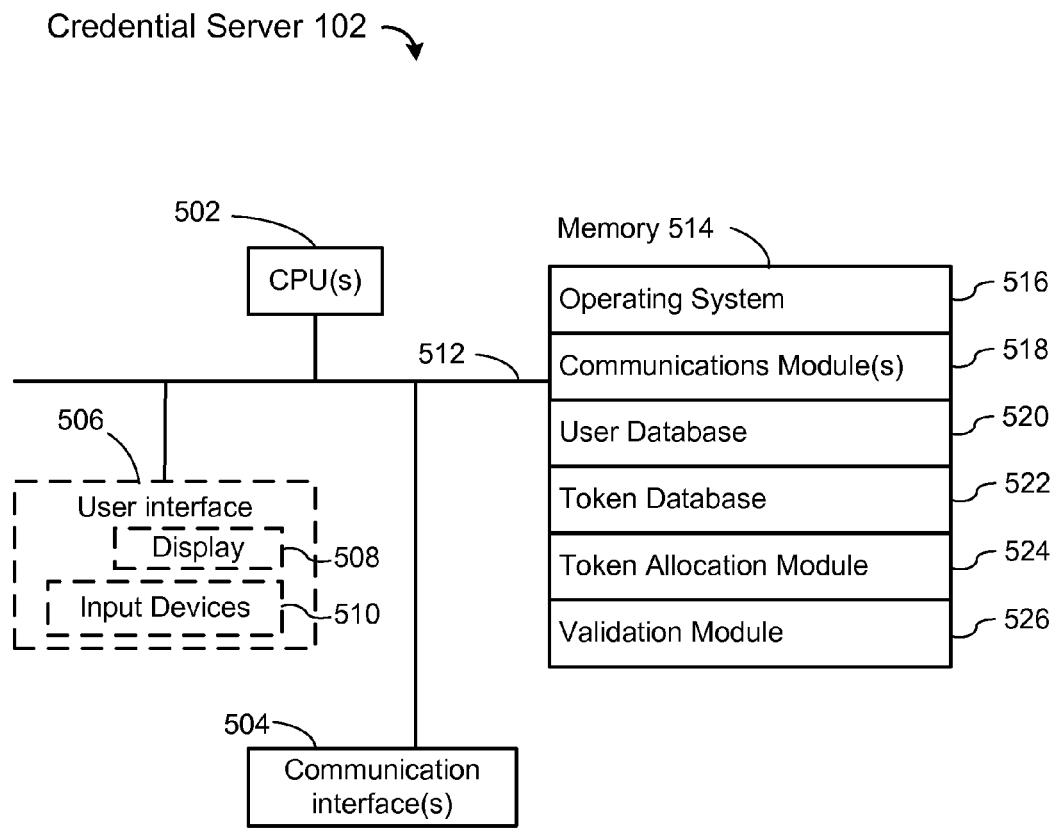
FIG. 5 is a block diagram of a credential server computer system according to some implementations.

FIG. 5 is a block diagram illustrating a credential server 102, which determines whether access to personal information 114 should be permitted or denied in accordance with some implementations. A "credential server" is also referred to herein as an authentication server or an authorization server. The credential server 102 typically includes one or more processing units (CPU's) 502 for executing modules, programs and/or instructions stored in memory 514 and thereby performing processing operations; one or more network or other communications interfaces 504; memory 514; and one or more communication buses 512 for interconnecting these components. The communication buses 512 may include circuitry (sometimes called a chipset) that interconnects and controls communications between system components. In some implementations, the credential server 102 includes a user interface 506, which may include a display device 508 and one or more input devices 510. In some implementations, memory 514 includes high-speed random access memory, such as DRAM, SRAM, DDR RAM or other random access solid state memory devices. In some implementations, memory 514 includes non-volatile memory, such as one or more magnetic disk storage devices, optical disk storage devices, flash memory devices, or other non-volatile solid state storage devices. Optionally, memory 514 includes one or more storage devices remotely located from the CPU(s) 502. Memory 514, or alternately the non-volatile memory device(s) within memory 514, comprises a computer readable storage medium. In some implementations, memory 514, or the computer readable storage medium of memory 514, stores the following programs, modules and data structures, or a subset thereof:

- an operating system 516 that includes procedures for handling various basic system services and for performing hardware dependent tasks;
- a communications module 518 that is used for connecting the credential server 102 to other computers via the one or more communication network interfaces 504 (wired or wireless) and one or more communication networks 112, such as the Internet, other wide area networks, local area networks, metropolitan area networks, and so on;
- a user database 520 that stores information about users 110 who have personal information 114 stored at the resource server 104. The stored information about a user may include the user's name, a unique identifier for the user (e.g., a user id or email address), an encrypted password, a listing of the personal information for the user 110 that is stored on the resource server 104, and/or a list of access tokens associated with the user. The user database 520 may also include a log of user activity;
- a token database 522 that stores information about access tokens. Access tokens provide an alternative means of accessing protected data, such as personal information 114. In some implementations, a user may authenticate with a user id and password, and receive a "permanent" token 226, which is used in subsequent access to personal information 114 (or other protected resources). In some implementations, a personal user device 106 uses a permanent access token 226 after an initial authentication. In this way, the user 110 need not "log in" each time access to the personal information 114 is required. For a shared user device 108, however, a permanent token 226 could be problematic, providing other users access to one user's personal information 114. Temporary access tokens 322 are similar to "permanent" tokens 226, but inherently have a limited lifetime (which in some instances is extendable). Another common difference between permanent tokens 226 and temporary tokens 322 is the set of access privileges. Whereas a permanent token 226 typically has plenary access to all personal information 114 for the user 110 (e.g., equivalent to providing user name and password), a temporary token 322 may have access to a limited portion of the personal information 114 corresponding to the user 110. The token database 522 contains information about access tokens, including type of token, access privileges, expiration date/time, and the corresponding user. In some implementations, the token database 522 and the user database 520 are consolidated into a single database, with various tables tracking the information about users and tokens;
- a token allocation module 524 that creates access tokens and associates appropriate access privileges with those tokens. In some instances, a user 110 can use a permanent token 226 in a request to create a temporary token 322. See, for example, FIG. 6 below; and
- a validation module 526 that receives a token and identifies the access privileges (if any) currently associated with the token. In some implementations, the validation module returns a yes/no value, indicating whether the token is valid. In other implementations, the validation module returns the set of privileges associated with the token. The set of privileges will be empty if the token is invalid or expired.

Each of the above identified elements in FIGS. 2-5 may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various implementations. In some implementations, memory 214, 314, 414, and 514 may store a subset of the modules and data structures identified above. Furthermore, memory 214, 314, 414, and 514 may store additional modules or data structures not described above.

Although FIGS. 2-5 illustrate personal devices, shares devices, resource servers, and credential servers, these figures are intended more as functional descriptions of the various features that may be present in a set of one or more computers rather than as a structural schematic of the implementations described herein. In practice, and as recognized by those of ordinary skill in the art, items shown separately could be combined and some items could be separated. For example, some items shown separately in FIG. 5 could be implemented on individual computer systems and single items could be implemented by one or more computer systems. The actual number of computers used to implement these features, and how features are allocated among them, will vary from one implementation to another, and may depend in part on the amount of data traffic that the system must handle during peak usage periods as well as during average usage periods.

Figure 6:
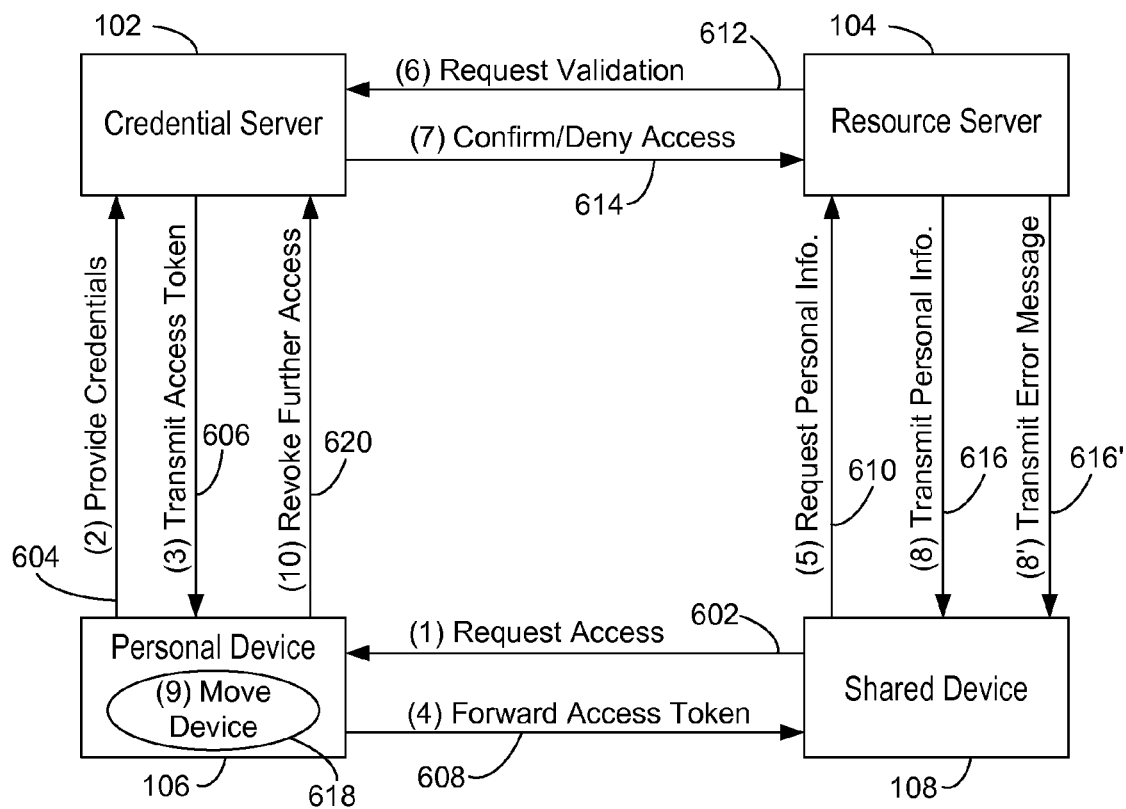
FIGS. 6 and 7 schematically illustrate processes for a shared user device to obtain personal user information according to some implementations.
Figure 7:
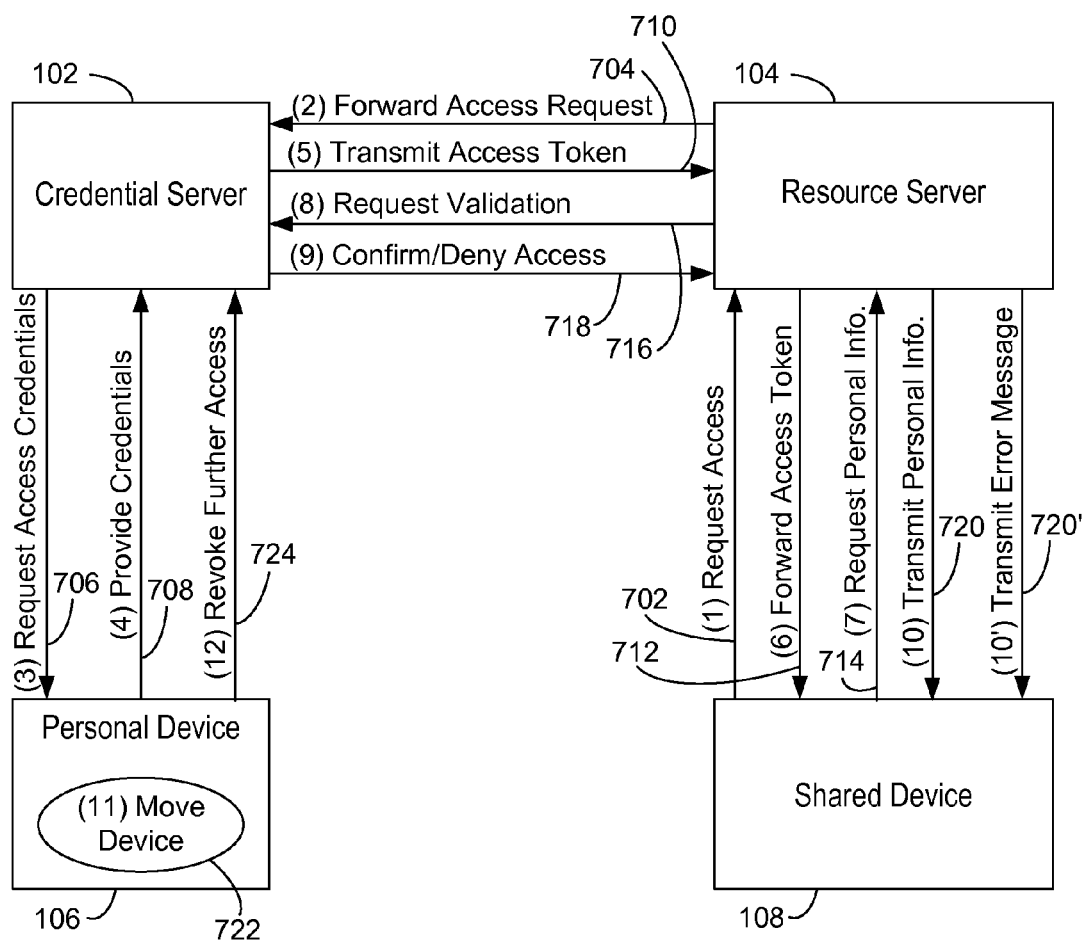

FIGS. 6 and 7 illustrate two exemplary processes for a shared user device 108 to obtain personal user information 114 from a resource server 104 according to some implementations. In these figures, a user 110 interacts with a software application 118 executing on the shared device 108, and the software application 118 seeks access to personal information 114 that is stored at a resource server 104. For example, the software application 118 can be an email application, and the email application must access the user's email (personal information 114) on the resource server 104.

A typical software application would prompt the user 110 to enter a user name and password, and then proceed directly to the personal information 114. One problem to this typical approach is that the shared device 108 may continue to access the personal information 114 even after the user 110 is no longer using the shared device 108. Other users of the shared device 108 could thus access the first user's private personal information 114. FIGS. 6 and 7 illustrate alternative ways to access the personal information 114 from the shared device 108 using a temporary access token 322. These illustrated implementations have multiple safeguards against inadvertently giving other users access to a first user's personal information 114.

In the implementation illustrated in FIG. 6, a user 110 at a shared device 108 is using a software application 118 that utilizes certain personal information 114 associated with the user 110. E.g., a social media website. The personal information 114 is stored at a resource server 104. The software application 118 needs an access token 322 in order to retrieve personal information 114. If the shared device 108 does not already have a valid access token 322 for the software application 118 (e.g., no existing access token 322 at all, the access token 322 is expired, etc.) then the software application 118 requests access. In some implementations, the shared device 108 presents a list of "granting" users/devices that can grant access to personal information 114. In the implementation of FIG. 6, the shared device 108 requests (602) access from the personal user device 106. In some implementations, the request is transmitted over network 112; in other implementations, the request is transmitted by a direct communication, such as Bluetooth.

In some implementations, the user interface 206 of the personal device 106 prompts the user 110 to enter authentication information, and the user 110 uses the user interface 206 (e.g. keyboard or soft keyboard 210) of the personal device 106 to enter the authentication information. In other implementations, the user interface 306 of the shared device 108 prompts the user 110 for authentication information prior to sending the request to personal user device 106. In these implementations, the authentication information may be included in the request or transmitted separately.

After receiving the request, the personal user device 106 provides (604) user credentials to the credential server 102. In some implementations, the credentials are supplied by the user 110 using the user interface 206 of the personal user device 106 (e.g., user ID and password). In some implementations, a permanent access token 226 is stored on the personal user device 106, and the permanent token is transmitted (604) to the credential server. In some implementations that use a permanent access token 226, the user 110 is prompted to confirm that access privileges should be granted. In some implementations, the credentials that are transmitted (604) to the credential server 102 also include a specification of the access privileges to be granted (e.g., limits in time and limits in scope).

When the credential server 102 receives the credentials from the personal user device 106, the credential server 102 creates a temporary access token 322 with appropriate privileges to access the personal information 114. The temporary access token 322 has an expiration date/time, which may be specified explicitly by the user 110 providing the credentials, or may be assigned a default value (e.g., 1 hour or 30 minutes after creation). (In some implementations, the expiration date/time can be extended as the time of expiration approaches, either automatically, or with user confirmation.) In some implementations, a temporary access token 322 is associated with a single specific software application 118 and the personal data 114 used by that software application 118. In other implementations, a temporary access token 322 is associated with a set of software applications 118, and the set includes one or more applications 118 (e.g., when the personal information 114 is shared by two or more applications 118).

After creating the temporary access token 322, the credential server 102 transmits (606) the access token 322 to the personal device 106. The personal device 106 then forwards (608) the access token 322 to the shared device 108. The shared device 108 stores the temporary access token 322 in memory 314 for subsequent usage.

The software application 118 executing on the shared device 108 requests (610) a portion of the personal information 114 from the resource server 104. The request includes the temporary access token 322. The request also specifies the portion of the personal information 114 sought. After receiving the request for information with the access token 322, the resource server 104 determines how to respond by requesting (612) validation of the temporary access token 322 from the credential server 102. The credential server 102 looks up the temporary access token 322 in its token database 522. Several different scenarios can occur, including:
- The temporary access token 322 is not found in the token database 522;
- The temporary access token 322 exists in the database 522, but the token 322 has expired;
- The temporary access token 322 exists in the database 522, but all privileges have been revoked;
- The temporary access token 322 exists in the database 522, but the specific portion of information 114 sought is outside the scope of privileges associated with the access token 322; or
- The temporary access token 322 is in the database 522, the token has not expired, the token's privileges have not been revoked, and the information requested falls within the scope of the granted privileges.

Some implementations provide additional scenarios beyond those specifically identified above, and some implementations have fewer scenarios (e.g., some implementations implement revocation of privileges by deleting the record from the database 522 or by setting the expiration date of the token to an earlier time).

The credential server 102 then confirms (614) or denies (614) access to the personal information 114. In some implementations, the response is a simple yes/no, indicating whether access should be allowed to the personal information 114. In some implementations, the credential server 102 includes an error message or the specific results of the token lookup in its response to the resource server 104, enabling the resource server 104 to provide a more detailed error message when access is denied.

Depending on the determination from the credential server 102, the resource server 104 either transmits (616) the requested personal information to the software application 118 at the shared device 108 or transmits (616') an error message to the software application 118 at the shared device 108. Upon receipt of the personal information 114 or the error message, the software application 118 proceeds to use the information 114 or display the error message to the user 110. In some implementations, receipt of certain error messages (such as an expired access token 322) triggers a renewal process. In other implementations, the user 110 can manually initiate a renewal process as needed. The renewal process is not illustrated in FIG. 6.

The renewal process for temporary access tokens 322 commences for various reasons, including:
- in response to user requests for protected information 114 (e.g., when the access token 322 is known to be expired);
- in response to an error message, as illustrated above in step 616'; or
- automatically, when the remaining lifetime of the access token 322 falls below a threshold level (e.g., 5 minutes or 0 minutes).

In some implementations, the renewal process is nearly the same as an initial access request. The user 110 must provide credentials, the credential server 102 verifies the credentials, and returns an updated (or new) access token 322, which the personal device 106 forwards to the shared device 108. In some implementations, renewal of a token creates a new access token 322; in other implementations, renewal of an access token 322 updates the expiration date of the existing access token 322.

In some implementations, the renewal process is manual or automatic depending on various factors. One factor is the status of the existing access token 322. If the access privileges have been revoked, then renewal is not automatic. The user 110 must reenter the credentials or in some way confirm that access should be granted. Another factor is whether the personal device 106 is within the appropriate renewal radius. In some implementations, the renewal radius is measured from the initial location of the personal device 106 (when access was first granted); in other implementations, the renewal radius is measured from the location of the shared user device 108. Either way, there is a predefined renewal radius, and if the personal device 106 is within that radius, the access token 322 is automatically renewed. Implementations generally combine these two factors. Thus, if the personal device 106 is within the renewal radius and the access privileges have not been revoked, the access token 322 is automatically renewed. Otherwise, the user 110 must provide access credentials or other confirmation in order to renew the access token 322. Some implementations utilize different or additional factors for determining when to automatically renew a temporary access token 322.

In addition to the time and scope limits imposed on temporary access tokens 322, the implementation illustrated in FIG. 6 also imposes an access limit based on the physical location of the personal device 106. A user 110 typically retains possession of the personal device 106, so as the person 110 moves, so does the personal device 106. If the personal device 106 moves more than a threshold distance, the user 110 is probably no longer accessing the shared user device 108, and thus the shared user device 108 should no longer have access to the personal information 114 of the user 110.

One of skill in the art will recognize that they are many ways to measure movement of the personal device 106. The location module 224 at personal device 106 utilizes various location information 222 and/or location/motion sensor(s) 232 to determine whether movement of the personal device 106 meets certain criteria. In some implementations, the personal device 106 has a GPS device 232 or other means of determining its position relative to the Earth. In these implementations, one way to measure movement is to identify the location of the personal device 106 when the temporary access token 322 is received from the credential server 102. When the position of the personal device 106 relative to the Earth is greater than a threshold distance from the original position, the personal device 106 has moved (618), so the personal device 106 revokes (620) further access using the access token 322. Some implementations use accelerometers 232 and/or gyroscopes 232 in addition to or instead of GPS to measure movement of the personal device 106.

In other implementations, the location module 224 measures the movement of the personal device relative to the shared user device 108 or relative to a wireless router or wireless access point. In some implementations, both the personal device 106 and the shared device 108 are Bluetooth enabled, and the strength of the signal between the devices correlates to the distance between the two devices. Some implementations use the strength of the Bluetooth signal as a measure of the movement. Similarly, some implementations use the strength of a WiFi signal (e.g., 802.11) at the personal device 106 as a measure of movement. The WiFi signal from a wireless router or wireless access point serves both for network connectivity (to networks 112) as well as identifying the movement of the personal device 106. One of skill in the art would recognize that other wireless signals received by the personal device 106 or other components included in the personal device 106 can be used by the location module 224 for measuring movement. The threshold distance that instigates access token revocation is referred to as the revocation radius.

The location module 224 can use any of the various techniques noted above to detect (618) movement of the personal user device 106 that exceeds a threshold amount. The threshold amount can be set to a few feet (e.g., 3 feet) or a larger distance (e.g., 15 feet). In some implementations, the threshold movement is set by the user 110, but other implementations set or fix the threshold amount of movement automatically. When the movement exceeds (618) the threshold amount, the personal device 106 revokes (620) the access privileges corresponding to the access token. In some implementations, the revocation is automatic when the predefined motion criteria are met; in other implementations, the user 110 is prompted by the user interface 206 to confirm or deny the revocation. The revocation is transmitted (620) to the credential server 102. Once the credential server 102 receives the revocation, the credential server 102 will deny (614) access in response to all subsequent requests to validate (612). The shared device 108 will therefore not be able to acquire any additional portions of the personal information 114.

In general, the renewal radius is less than the revocation radius. Once the personal device 106 has moved outside the revocation radius, the privileges are revoked, and the privileges are not automatically restored if the user 110 moves the personal device back inside the revocation radius. On the other hand, movement of the personal device 106 outside the renewal radius just means that the access token will not be renewed at that time. Some implementations will attempt to renew the token 322 multiple times, so if the personal device 106 is back within the renewal radius during one of the subsequent renewal attempts, the access token 322 will be renewed. One of skill in the art recognizes that when movement is measured by signal strength, the renewal radius and revocation radius are measured by signal strength rather than units of distance, or a conversion is performed to convert signal strength measurements into distance.

Because the revocation process and the renewal process are independent features, some implementations provide only one of these features. For example, some implementations provide automatic revocation of privileges based on movement of the personal device 106, but do not provide any renewal process (or provide only a manual renewal process). Other implementations provide a renewal process, but do not provide for automatic revocation of privileges based on movement of the personal device 106.

The implementation illustrated in FIG. 7 is similar to the implementation of FIG. 6, but does not involve direct communication between the personal user device 106 and the shared user device 108. As in FIG. 6, a user 110 at a shared device 108 is using a software application 118 that utilizes certain personal information 114 associated with the user 110. The personal information 114 is stored at a resource server 104. The software application 118 needs an access token 322 in order to retrieve personal information 114. If the shared device 108 does not already have a valid access token 322 for the software application 118 (e.g., no existing access token 322 at all, the access token 322 is expired, etc.) then the software application 118 requests access. In the implementation of FIG. 7, the shared device 108 requests (702) access from the resource server 104 using network 112.

As in FIG. 6, some implementations prompt the user 110 to enter access authentication information at the shared device 108, and include the authentication information with the request. In these implementations, steps (3) and (4) (706, 708) are not performed.

After receiving the request, the resource server forwards (704) the request to the credential server 102. The credential server, in turn, requests (706) access credentials from the personal device 106. In general, the user 110 enters the credentials using the user interface 206 of the personal user device 106 (e.g., user ID and password), and the personal device 106 provides (708) the credentials to the credential server.

In some implementations, a permanent access token 226 is stored on the personal user device 106, and the permanent token is transmitted (708) to the credential server. In some implementations that use a permanent access token 226, the user 110 is prompted to confirm that access privileges should be granted. In some implementations, the credentials that are provided (708) to the credential server 102 also include a specification of the access privileges to be granted (e.g., limits in time and limits in scope).

When the credential server 102 receives the credentials from the personal user device 106, the credential server 102 creates a temporary access token 322 with appropriate privileges to access the personal information 114. The temporary access token 322 has an expiration date/time, which may be specified explicitly by the user 110 providing the credentials, or may be assigned a default value (e.g., 1 hour or 30 minutes). (In some implementations, the expiration date/time can be extended as the time of expiration approaches, either automatically, or with user confirmation. See above explanation with respect to FIG. 6.) In some implementations, a temporary access token 322 is associated with a single specific software application 118 and the personal data 114 used by that software application 118. In other implementations, a temporary access token 322 is associated with a set of software applications 118, and the set includes one or more applications 118 (e.g., when the personal information 114 is shared by two or more applications 118).

After creating the temporary access token 322, the credential server 102 transmits (710) the access token 322 to the resource server 104, and the resource server 104 forwards (712) the access token 322 to the shared device 108. The shared device 108 stores the temporary access token 322 in memory 314 for subsequent usage.

The remainder of FIG. 7 corresponds to the process illustrated in FIG. 6 above. In particular, steps 714-718 in FIG. 7 correspond to steps 610-614 in FIG. 6, the two alternative steps 720/720' in FIG. 7 correspond to the two alternative steps 616/616' in FIG. 6, and steps 722-724 in FIG. 7 correspond to steps 618 and 620 in FIG. 6. In addition, the techniques disclosed in FIG. 6 for renewal or revocation of access tokens 322 apply equally to the implementation illustrated in FIG. 7.

Figure 8A:
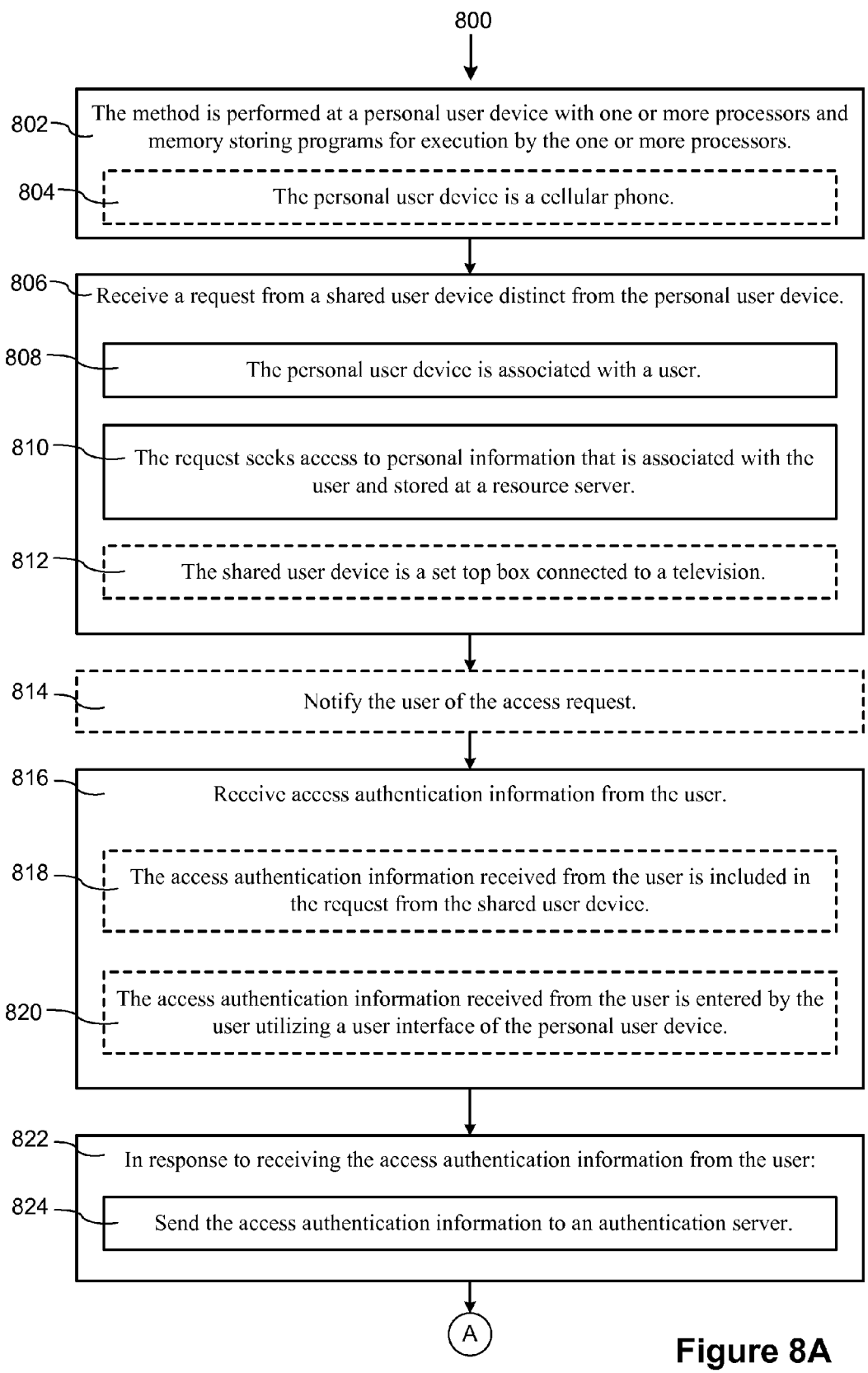
FIGS. 8A-C provide a flowchart of a process, performed at a personal user device, for providing a shared user device access to personal user information according to some implementations.
Figure 8B:
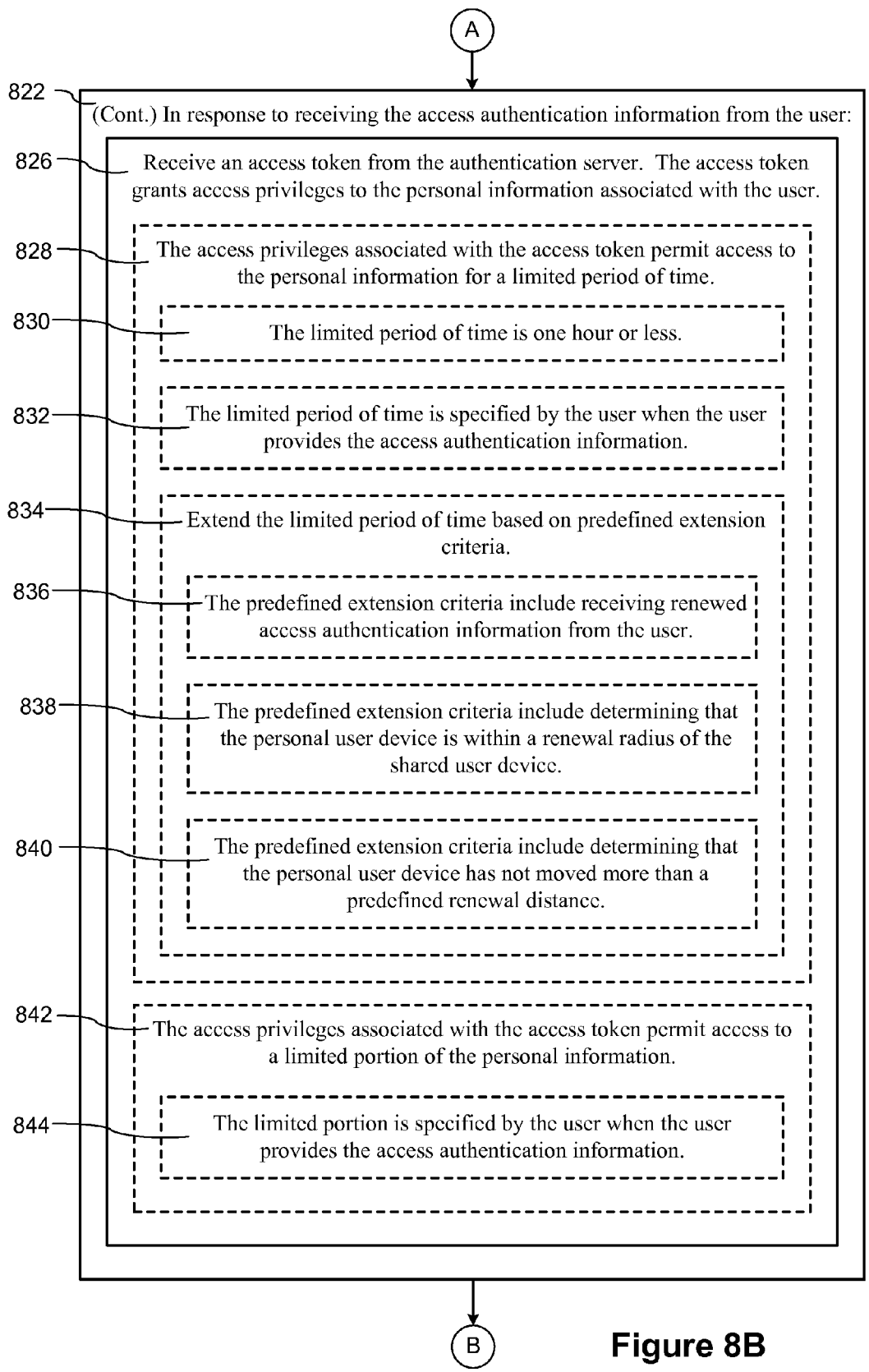
Figure 8C:
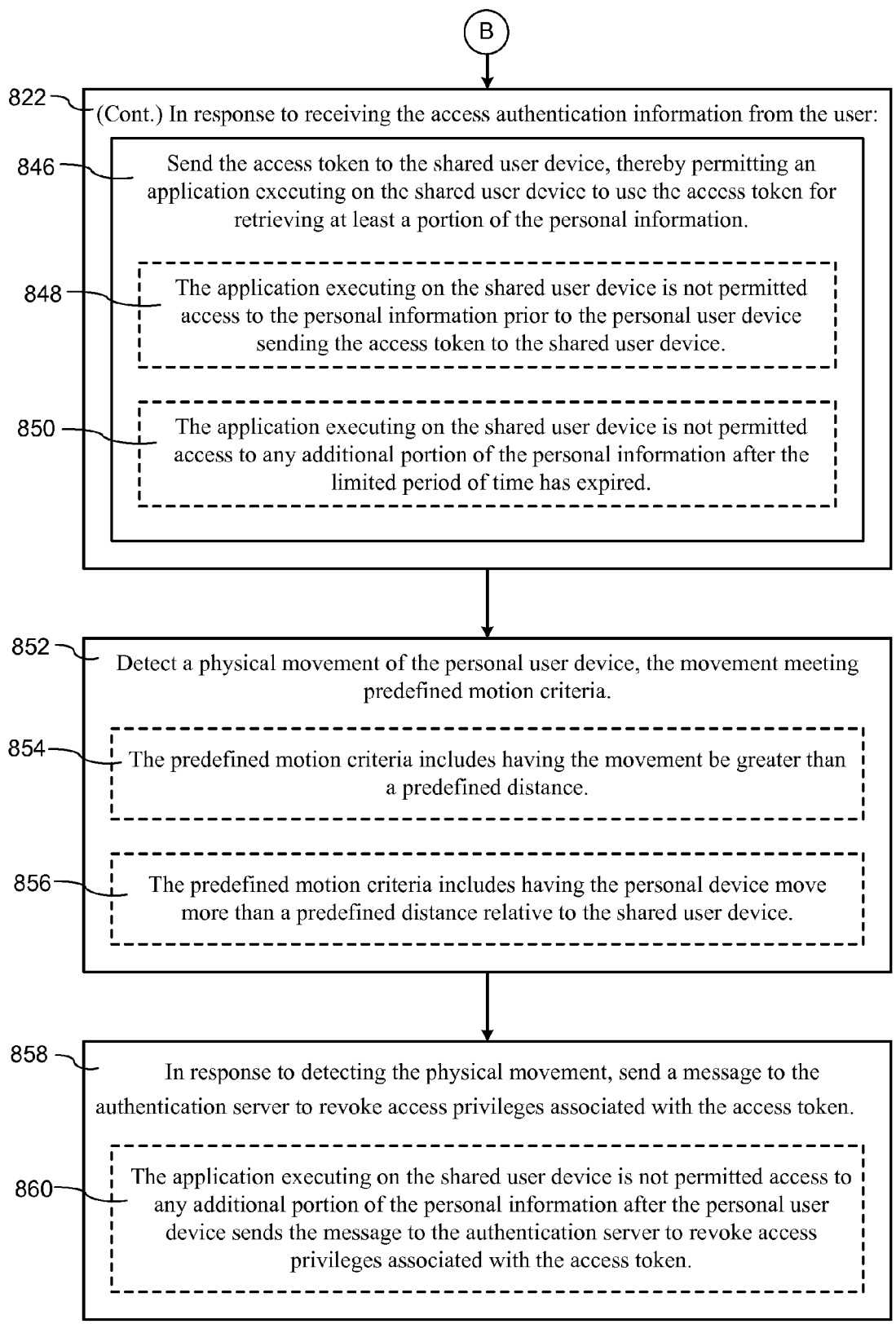

FIGS. 8A-C provide a flowchart of a process 800, performed by an Authentication Module 228 at a personal user device 106. The process 800 provides a shared user device 108 access to personal user information 114 according to some implementations. The process 800 is performed (802) at a personal user device 106 with one or more processors and memory. The memory stores one or more programs for execution by the one or more processors. In some implementations, the personal user device 106 is (804) a cellular phone (e.g., a Smartphone, such as a phone running the ANDROID™ operating system).

The process 800 receives (806) a request from a shared user device 108, which is distinct from the personal user device 106. The personal user device is associated (808) with a specific user 110. The request seeks (810) access to personal information 114 that is associated with the user 110 and is stored (810) at a resource server 104. In some implementations, the shared user device 108 is (812) a set top box (e.g., GOOGLE TV running the ANDROID™ operating system) connected to a television. In other implementations, the shared user device 108 is a desktop computer or a laptop computer. In some implementations, the process 800 notifies (814) the user 110 of the access request, using the user interface 206 of the personal device 106. The personal device 106 receives (816) access authentication information from the user 110 or retrieves access authentication information from the personal device 106 (e.g., user ID and password, or a permanent access token). In some implementations, the access authentication information received from the user 110 is included (818) in the request from the shared user device 108. That is, the user enters access authentication information on the shared device 108, and that information is included in the request. In other implementations, the access authentication information received from the user 110 is entered (820) by the user utilizing a user interface of the personal user device 106.

In response to (822) receiving the access authentication information, the process 800 performs several operations, including: sending (824) the access authentication information to an authentication server 102 (also known as a credential server); and receiving (826) an access token 322 from the authentication server 102.

In some implementations, the access privileges associated with the access token 322 limit (828) the period of time for which the token 322 permits access to the personal information 114. In some implementations, the limited period of time is (830) one hour or less (e.g. 1 hour, 30 minutes, or 10 minutes). In some implementations, the limited period of time is (832) specified by the user 110 when the user provides the access authentication information.

In some implementations that limit (828) the period of time for which the token 322 permits access to the personal information 114, the process 800 extends (834) the limited period of time based on predefined extension criteria. In some implementations, the limited period of time is extended when the remaining time falls below a threshold (e.g., 10 minutes, 0 minutes, half of the original period of time). In some implementations, the predefined extension criteria include (836) receiving renewed access authentication information from the user 110. In some implementations, the predefined extension criteria include (838) determining that the personal user device 106 is within a renewal radius of the shared user device. In some implementations, the predefined extension criteria include (840) determining that the personal user device 106 has not moved more than a predefined renewal distance. In some implementations, the predefined extension criteria include determining that the access privileges for the access token 322 have not been revoked.

In some implementations, the access privileges associated with the access token 322 permit (842) access to a limited portion of the personal information 114. In some implementations, the user 110 specifies (844) the limited portion when the user 110 provides access authentication information.

In response to (822) receiving the access authentication information, the process 800 also sends (846) the access token 322 to the shared user device 108. The access token 322 enables (846) the software application 118 executing on the shared user device 108 to retrieve portions of the user's personal information 114 stored at the resource server 104. This is described in more detail above with respect to FIGS. 6 and 7. The shared user device 108 includes the access token 322 in its requests for personal information 114. In some implementations, the software application 118 executing on the shared user device 108 is not permitted (848) access to the personal information 114 prior to the time that the personal user device 106 sends the access token 322 to the shared user device 108. In some implementations, the software application 118 executing on the shared user device 108 is not permitted (850) access to any additional portion of the personal information 114 after the limited period of time has expired.

If the user 110 does not move the personal user device 106 (or the movement is less than a specified threshold), the user 110 can continue to access the person information 114 from the shared user device 108 until the access token 322 expires. The location module 224 at the personal user device 106 monitors the movement of the personal user device 106, and in some instances detects (852) a physical movement of the personal user device 106 that meets predefined motion criteria. In some implementations, the predefined motion criteria include (854) having the movement be greater than a predefined distance (e.g., relative to the Earth). In some implementations, the predefined motion criteria include (856) having the personal user device 106 move more than a predefined distance relative to the shared user device 108. Techniques of measuring movement are explained in more detail above with respect to FIGS. 6 and 7. In response to detecting the physical movement, the process 800 sends (858) a message to the authentication server 102 to revoke access privileges associated with the access token 322. In some implementations, the user 110 must confirm the revocation of the access privileges. In some implementations, the application 118 executing on the shared user device 108 is not permitted (860) access to any additional portion of the personal information 114 after the personal user device 106 sends the message to the authentication server 102 to revoke access privileges associated with the access token 322.

FIGS. 9A-B provide a flowchart of a process 900, performed by a Validation Module 526 at an authentication server 102. The process 900 provides a shared user device 108 access to personal user information 114 according to some implementations. An authentication server is also referred to herein as a credential server or an authorization server. The process 900 is performed (902) at a authentication server 102 with one or more processors and memory. The process 900 receives (904) a request from a shared user device 108, the request seeking access to personal information 114 that is associated with a user 110 and stored at a resource server 104. As illustrated in FIGS. 6 and 7, the request for access can be routed through a personal device 106 or through a resource server 104. In some implementations, the request for access is transmitted directly from the shared user device 108 to the authentication server 102.

The authentication server subsequently receives (906) access authentication information from a personal user device 106 (e.g., user ID and password, or a permanent access token 226). In some implementations, the personal user device is (908) a cellular phone, such as a Smart phone running the ANDROID™ operating system.

The authentication server 102 creates (910) an access token 322 that grants privileges to access the personal information 114 associated with the user 110. In some implementations, the authentication server limits (912) the period of time for which the access token 322 permits access to the personal information 114. In some implementations, the limited period of time is (914) one hour or less (e.g., exactly one hour, or 30 minutes, or minutes). In some implementations, the authentication server receives (916) a specification of the limited period of time from the personal user device 106. In some implementations, the authentication server 102 will later extend (918) the limited period of time based on predefined extension criteria. In some implementations, the predefined extension criteria include (920) receiving renewed access authentication information from the personal user device 106. More details of the renewal process and the extension criteria are provided with respect to FIG. 6.

In some implementations, the access privileges associated with the access token 322 permit (922) access to a limited portion of the personal information 114. In some implementations, the authentication server receives (924) a specification of the limited portion from the personal user device 106. The authentication server 102 provides (926) the access token 322 to the shared user device. As illustrated in FIGS. 6 and 7, the access token 322 may be provided (926) to the shared user device 108 through the personal device 106 or the resource server 104. In some implementations, the authentication server 102 provides (926) the access token 322 directly to the shared device 108.

Once the temporary access token 322 is created, it remains valid until it expires or has its privileges revoked. Prior to receiving (928) from the personal device 106 a command to revoke access privileges associated with the access token, in some implementations the authentication server receives (930) a validation request from the resource server 104, which includes the access token 322. In some implementations, the authentication server 102 determines (932) that access privileges associated with the access token 322 have not been revoked, and notifies (934) the resource server 104 that the validation has passed, which permits access to the personal information 114 by the shared user device 108.

In some implementations, the process 900 performs (936) the following steps for each request from the shared user device 108 to access personal information 114 from the resource server 104: i) receive (938) a validation request from the resource server, which includes the access token 322; ii) determine (940) whether the access privileges associated with the access token 322 are currently valid for the personal information 114 requested; and iii) notify (942) the resource server of the determination, thereby permitting or preventing access to the personal information 114 by the shared user device 108. There are multiple reasons why access can be denied, including: i) the access token 322 provided does not exist in the token database 522; ii) the access token 322 has expired; iii) the access token has had its privileges revoked; or iv) the specific personal information 114 sought is outside the scope of privileges associated with the access token 322. Some implementations also implement security features to prevent usage of an access token 322 by an unintended device (e.g., utilizing a unique identifier of the shared user device 108 or a hash thereof).

The authentication server 102 receives (944) from the personal device 106 a command to revoke access privileges associated with the access token 322. After receiving the revocation command, the authentication server 102 receives (946) a validation request from the resource server 104, which includes the access token 322. The authentication server determines (948) that the access privileges associated with the access token 322 have been revoked, and notifies (950) the resource server 104 that the validation request failed. The notification thereby prevents (950) access to the personal information 114 by the shared user device 108.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
at a personal user device with one or more processors and memory storing programs for execution by the one or more processors:
receiving a request initiated by a user of the personal user device, wherein the user initiates the request from a shared user device distinct from the personal user device, the personal user device is a mobile device configured for use by one person and associated with the user, the shared user device is usable by two or more people and has a larger display than the personal user device, and the request seeks access to personal information that is associated with the user and stored at a resource server;
receiving access authentication information from the user;
in response to receiving the access authentication information from the user:
sending the access authentication information to an authentication server;
receiving an access token from the authentication server, the access token granting access privileges to the personal information associated with the user;
sending the access token to the shared user device, thereby permitting an application executing on the shared user device to use the access token for retrieving at least a portion of the personal information;
detecting, by the personal user device, a physical movement of the personal user device, the movement meeting predefined motion criteria; and
in response to detecting the physical movement, sending, by the personal user device, a message to the authentication server to revoke the granted access privileges associated with the access token.

2. The method of claim 1, wherein the predefined motion criteria include determining that a distance from a first location of the personal user device to a current location of the person user device exceeds a predefined distance, wherein the first location corresponds to when the access authentication information was received from the user.

3. The method of claim 1, wherein the predefined motion criteria include having the personal user device move more than a predefined distance from the shared user device.

4. The method of claim 1, wherein the application executing on the shared user device is not permitted access to the personal information prior to the personal user device sending the access token to the shared user device.

5. The method of claim 1, wherein the application executing on the shared user device is not permitted access to any additional portion of the personal information after the personal user device sends the message to the authentication server to revoke access privileges associated with the access token.

6. The method of claim 1, wherein the access privileges associated with the access token permit access to the personal information for a limited period of time, the method further comprising extending the limited period of time based on predefined extension criteria.

7. The method of claim 6, wherein the predefined extension criteria include determining that the personal user device is within a renewal radius of the shared user device.

8. The method of claim 6, wherein the predefined extension criteria include determining that the personal user device has not moved more than a predefined renewal distance.

9. A personal user device, comprising:
one or more processors;
memory; and
one or more programs stored in the memory for execution by the one or more processors, the one or more programs comprising executable instructions for:
  receiving a request initiated by a user of the personal user device, wherein the user initiates the request from a shared user device distinct from the personal user device, the personal user device is a mobile device configured for use by one person and associated with the user, the shared user device is usable by two or more people and has a larger display than the personal user device, and the request seeks access to personal information that is associated with the user and stored at a resource server;
  receiving access authentication information from the user;
  in response to receiving the access authentication information from the user:
    sending the access authentication information to an authentication server;
    receiving an access token from the authentication server, the access token granting access privileges to the personal information associated with the user;
    sending the access token to the shared user device, thereby permitting an application executing on the shared user device to use the access token for retrieving at least a portion of the personal information;
  detecting, by the personal user device, a physical movement of the personal user device, the movement meeting predefined motion criteria; and
  in response to detecting the physical movement, sending, by the personal user device, a message to the authentication server to revoke the granted access privileges associated with the access token.

10. The personal user device of claim 9, wherein the predefined motion criteria include determining that a distance from a first location of the personal user device to a current location of the person user device exceeds a predefined distance, wherein the first location corresponds to when the access authentication information was received from the user.

11. The personal user device of claim 9, wherein the predefined motion criteria include having the personal user device move more than a predefined distance from the shared user device.

12. The personal user device of claim 9, wherein the application executing on the shared user device is not permitted access to the personal information prior to the personal user device sending the access token to the shared user device.

13. The personal user device of claim 9, wherein the application executing on the shared user device is not permitted access to any additional portion of the personal information after the personal user device sends the message to the authentication server to revoke access privileges associated with the access token.

14. The personal user device of claim 9, wherein the access privileges associated with the access token permit access to the personal information for a limited period of time, and wherein the one or more programs further comprise instructions for extending the limited period of time based on predefined extension criteria.

15. The personal user device of claim 14, wherein the predefined extension criteria include determining that the personal user device is within a renewal radius of the shared user device.

16. The personal user device of claim 14, wherein the predefined extension criteria include determining that the personal user device has not moved more than a predefined renewal distance.

17. A non-transitory computer readable storage medium storing one or more programs configured for execution by a personal user device having one or more processors and memory storing one or more programs for execution by the one or more processors, the one or more programs comprising executable instructions for:
  receiving a request initiated by a user of the personal user device, wherein the user initiates the request from a shared user device distinct from the personal user device, the personal user device is a mobile device configured for use by one person and associated with the user, the shared user device is usable by two or more people and has a larger display than the personal user device, and the request seeks access to personal information that is associated with the user and stored at a resource server;
  receiving access authentication information from the user;
  in response to receiving the access authentication information from the user:
    sending the access authentication information to an authentication server;
    receiving an access token from the authentication server, the access token granting access privileges to the personal information associated with the user;
    sending the access token to the shared user device, thereby permitting an application executing on the shared user device to use the access token for retrieving at least a portion of the personal information;
  detecting, by the personal user device, a physical movement of the personal user device, the movement meeting predefined motion criteria; and
  in response to detecting the physical movement, sending, by the personal user device, a message to the authentication server to revoke the granted access privileges associated with the access token.

18. The computer readable storage medium of claim 17, wherein the predefined motion criteria include determining that a distance from a first location of the personal user device to a current location of the person user device exceeds a predefined distance, wherein the first location corresponds to when the access authentication information was received from the user.

19. The computer readable storage medium of claim 17, wherein the predefined motion criteria include having the personal user device move more than a predefined distance from the shared user device.

20. The computer readable storage medium of claim 17, wherein the application executing on the shared user device is not permitted access to the personal information prior to the personal user device sending the access token to the shared user device.

21. The computer readable storage medium of claim 17, wherein the application executing on the shared user device is not permitted access to any additional portion of the personal information after the personal user device sends the message to the authentication server to revoke access privileges associated with the access token.

22. The computer readable storage medium of claim 17, wherein the access privileges associated with the access token permit access to the personal information for a limited period of time, and wherein the one or more programs further comprise instructions for extending the limited period of time based on predefined extension criteria.

23. The computer readable storage medium of claim 22, wherein the predefined extension criteria include determining that the personal user device is within a renewal radius of the shared user device.

24. The computer readable storage medium of claim 22, wherein the predefined extension criteria include determining that the personal user device has not moved more than a predefined renewal distance.

* * * * *

UNITED STATES PATENT AND TRADEMARK OFFICE
CERTIFICATE OF CORRECTION

PATENT NO. : 9,256,722 B2  
APPLICATION NO. : 13/554928  
DATED : February 9, 2016  
INVENTOR(S) : Saxman et al.

Page 1 of 1

It is certified that error appears in the above-identified patent and that said Letters Patent is hereby corrected as shown below:

In the Claims

Claim 2, column 18, line 41, please delete "person user" and insert --personal user--;

Claim 10, column 19, line 42, please delete "person user" and insert --personal user--;

Claim 18, column 20, line 47, please delete "person user" and insert --personal user--.

Signed and Sealed this  
Third Day of May, 2016

Michelle K. Lee  
*Director of the United States Patent and Trademark Office*